United States Patent [19]
Loch et al.

[11] 4,255,840
[45] Mar. 17, 1981

[54] METHOD OF REPAIRING A HEATING ELEMENT IN A PRESSURIZER

[75] Inventors: Emil P. Loch, Tampa; Frank J. Mendolia, Valrico, both of Fla.

[73] Assignee: Westinghouse Electric Corp., Pittsburgh, Pa.

[21] Appl. No.: 624,349

[22] Filed: Oct. 21, 1975

[51] Int. Cl.² .............................................. B23P 7/00
[52] U.S. Cl. .............................. 29/157 R; 29/402.07; 29/402.08
[58] Field of Search ............. 29/157 R, 401 B, 401 F, 29/DIG. 48; 228/119, 178, 184; 219/316, 318, 336, 335, 312

[56] References Cited
U.S. PATENT DOCUMENTS

| | | | |
|---|---|---|---|
| 1,817,850 | 8/1931 | Schwalback | 219/205 |
| 2,585,237 | 2/1952 | Gay | 228/184 |
| 3,114,414 | 12/1963 | Judd | 219/316 |
| 3,305,002 | 2/1967 | Leonard, Jr. et al. | 219/316 |
| 3,446,939 | 5/1969 | Morgan et al. | 219/316 |
| 3,446,940 | 5/1969 | Morgan | 219/316 |

*Primary Examiner*—Daniel C. Crane
*Attorney, Agent, or Firm*—F. J. Baehr, Jr.

[57] ABSTRACT

A method of installing an immersion heater in a pressurizer for a nuclear power plant by increasing the metal mass adjacent the weld which seals the juncture between the immersion heater and a nozzle in the pressurizer.

1 Claim, 2 Drawing Figures

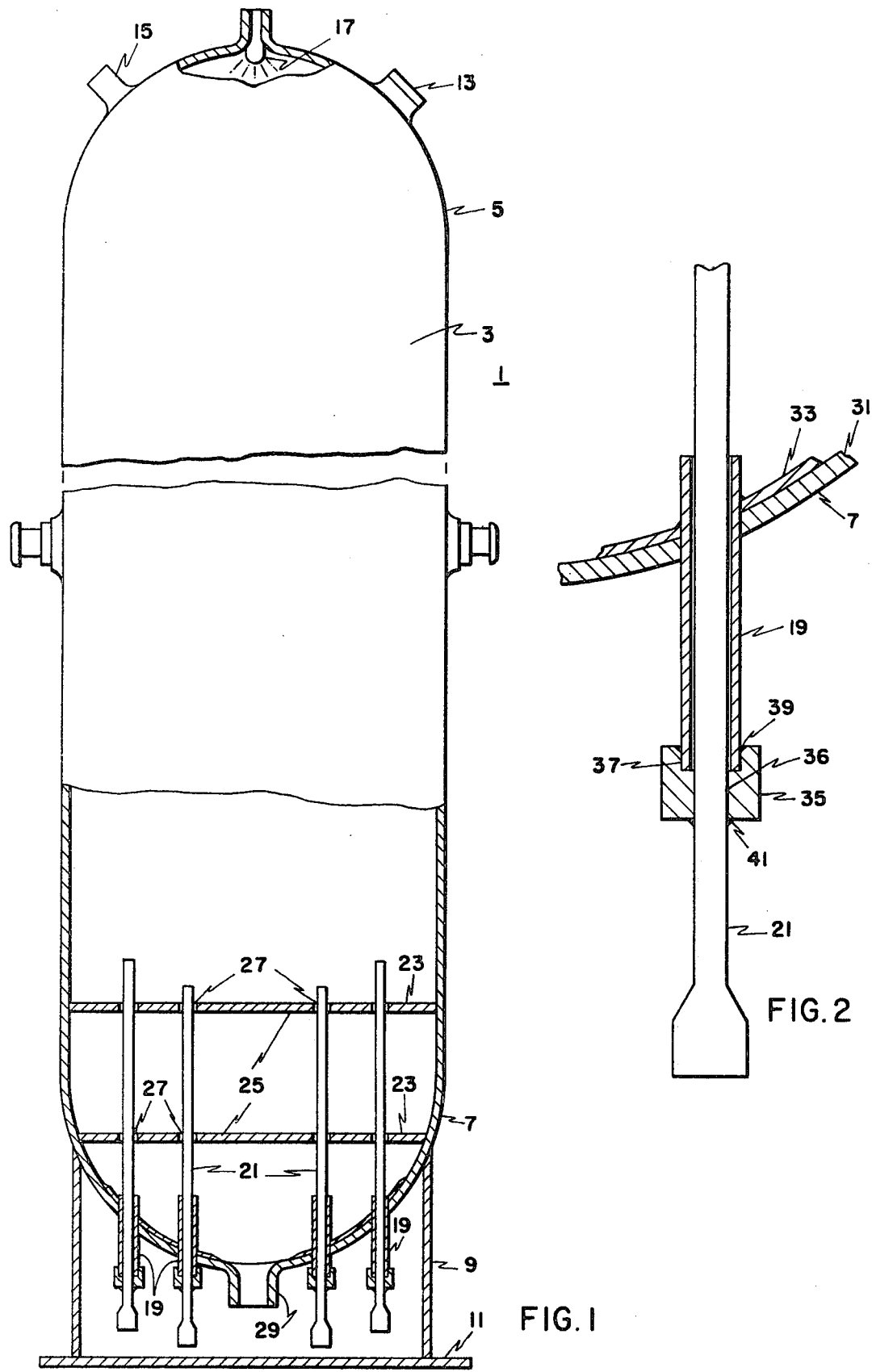

METHOD OF REPAIRING A HEATING ELEMENT IN A PRESSURIZER

BACKGROUND OF THE INVENTION

This invention relates to pressurizers and more particularly to a method for installing an immersion heater in a pressurizer.

Pressurizers are utilized in pressurized water reactor nuclear power systems to control the pressure on the primary loop and to act as a surge vessel.

Since the pressurizer contains primary fluid which is radioactive during operation, there is a slight residue radioactivity when the pressurizer is taken out of operation so that improving the maintenance on the pressurizer is not only economical, but also reduces the exposure of maintenance personnel to radiation.

SUMMARY OF THE INVENTION

In general, a method for installing a straight tubular heating element having an outer metal sheath in a head portion of a pressurizer of a nuclear power plant, when performed in accordance with this invention, comprises the steps of forming an opening in the head portion of the pressurizer; inserting a tube having a thickened wall on one end in the opening; welding the tube to the internal periphery of the opening, inserting a tubular heating element in the tube so that the outer end thereof is spaced from the outer end of the tube; and forming a weld bead on the thickened end of the tube so that there is penetration into the sheath of the heating element to effectuate a seal therebetween.

BRIEF DESCRIPTION OF THE DRAWINGS

The objects and advantages of this invention will become more apparent from reading the following detailed description in connection with the accompanying drawings, in which:

FIG. 1 is a partial sectional view of a pressurizer; and

FIG. 2 is an enlarged partial sectional view of a heating element and nozzle arrangement.

DESCRIPTION OF THE PREFERRED EMBODIMENT

Referring now to the drawings, and particularly to FIG. 1, there is shown a pressurizer 1 for a pressurized water nuclear power plant system. The pressurizer 1 comprises a vessel having a vertically oriented cylindrical shell portion 3, a first or upper hemispherical head portion 5, and a second or lower hemispherical head portion 7. A cylindrical skirt 9 extends downwardly from the lower head portion 7 and has a flange 11 fastened thereto by welding or other means to form a support structure for the vessel. The upper head portion 5 has a man-hole or man-way 13, one or more nozzles 15 in fluid communication with safety valve (not shown), and a spray nozzle 17 disposed therein. The spray nozzle 17 is in fluid communication with a supply of relatively cool primary fluid and has means associated therewith (not shown), which controls the flow of the relatively cool fluid to the pressurizer.

A plurality of nozzles 19 are vertically disposed in the lower head 7 and a plurality of straight tubular electrical immersion heating elements 21 extend through the nozzles 19 and into the pressurizer 1. The heating elements 21 have a metal sheath covering the outer surface thereof and seal welds are formed between the metal sheaths and the nozzles. To support the heating elements in the pressurizer a plurality of support plates 25 are disposed transversely in the lower portion thereof. The support plates 25 have a plurality of holes 27 which receive the heating elements 21.

A combined inlet and outlet nozzle 29 is centrally disposed in the lower head 7 and places the pressurizer in fluid communication with the primary fluid system of the pressurized water nuclear reactor power plant.

As shown in FIG. 2, the nozzle 19 which receives the immersion heating element 21 extends through the lower head 7. The lower head 7 has cladding 31 disposed on the inner side thereof and the area 33 adjacent the opening has an added amount of cladding and the inner end of the nozzle 19 is welded to this added portion of cladding. The outer end of the nozzles 19 has a thickened end or boss 35 formed thereon. The boss 35 is generally cylindrically shaped and has a centrally disposed bore 36 extending therethrough. The bore 36 is generally the same diameter as the opening in the nozzle 19. The boss 35 also has a counterbore 37, which receives the nozzle 19. A circumferential weld 39 is formed on a boss adjacent the counterbore fastening the boss to the nozzle. Another circumferential weld 41 is disposed on the outer planar surface of the boss 35 in such a manner as to penetrate the sheath of the immersion heating element 21 to form a seal between the sheath and the boss 35.

The method of installing a straight tubular immersion heating element in a head of a pressurizer of a nuclear power plant comprises the steps of:

Forming an opening in the lower head portion of the pressurizer to receive a nozzle;

Forming the cladding 31 within the head 7 so that the portion 33 adjacent the opening is thicker than normal;

Forming the nozzle 19 so that one end thereof has a thickened wall or a boss 35 thereon, the boss 35 being generally cylindrical and having a centrally disposed axial bore 36 aligned with the opening in the nozzle 19, the boss 35 also having a counterbore 37 adapted to receive the nozzle 19;

Forming a circumferential fillet weld 39 adjacent the counterbore to affix the boss 35 to the nozzle 19;

Inserting the nozzle 19 in the opening in the head 7 so that the boss 35 is on the distal end of the nozzle 19 away from the head 7;

Welding the nozzle 19 to the head 7 by forming a fillet weld inside the head 7 at the juncture of the nozzle and inner side of the opening in the head 7 to affix the nozzle 19 to the head 7 and form a seal therebetween;

Inserting an immersion heating element 21 in the nozzle 19 so that the end of the heating element is spaced from the end of the nozzle;

Forming a circumferential weld 41 on the planar surface of the boss 35 adjacent the juncture of the boss 35 and the heating element 21 so that the weld penetrates the sheath of the heating element 21, affixes the heating element 21 to the nozzle 19 and forms a seal therebetween;

Testing the heating elements 21 to locate any defective elements;

Removing the weld 41 at the juncture of the boss 35 and the sheath of the heating element 21 on the defective element;

Removing the defective heating element;

Removing a portion of the distal end of the boss 35 by grinding or other means so as to remove any portions of the boss degradated by previous welds;

Inserting an operable immersion heating element 21 into the prepared nozzle 19 so that the distal end of the immersion heating element 21 is spaced from the boss 35, the distance between the boss and the end of the heating element being sufficient to protect the end of the heating element from the heat buildup during the welding process as the end of the heating element has silver brazed electrical connections disposed therein, which are subject to damage, if overheated;

Forming a circumferential weld 41 at the juncture of the boss 35 and the sheath of the heating element 21 to affix the heating element 21 to the boss 35 and form a seal therebetween.

The apparatus and method hereinbefore described advantageously moves the primary pressure boundary from the end of the heating element 21 to an intermediate portion of the heater sheath so that end of the heating element 21 need not be welded to the sheath in accordance with Section 3 of the ASME code for nuclear pressure vessels. This method also reduces the complexity of welding the heating element sheath to the boss 35 by eliminating the use of cooling coils, which were originally needed to prevent the melting of the silver brazed electrical connection within the end of the heating element. The extras mass in the boss 35 on the nozzle 19 facilitates the use of existing welding parameters, wherein the weld is applied to the nozzle and allowed to penetrate the relatively thin walled sheath to produce satisfactory welds utilizing gas tungsten arc welding specifications without the need of utilizing local cooling to prevent internal damage to the heating element. The mass of the boss 35 also allows for multiple field repairs by providing excess material, which can be ground or cut away to remove any degradation in the boss 35 due to previous welds.

What is claimed is:

1. The method of replacing immersion heating elements having a metallic sheath welded to a thickened end of a tubular nozzle wherein said heating element is concentrically disposed within said nozzle and said nozzle is attached to the head portion of a pressurizer of a nuclear power plant comprising the steps of:

cutting away at least a portion of a weld disposed at the external juncture of the nozzle and the heating element so that the heating element may be removed from the nozzle;

removing the defective heating element from the nozzle;

removing sufficient metal from the outer surface of the nozzle to remove all metal degradated by the previous weld at the juncture between the nozzle and the sheath;

inserting an operable heating element in the nozzles so that there is a space between the end of the nozzle and the end of the heating element, the space being sufficient to prevent the end of the heating element from being overheated from the heat buildup during the subsequent welding step, welding a bead on the outer surface of said thickened portion of the nozzle in such a manner that there is penetration of the sheath of the heating element to form a seal therebetween and solely fix the heating element with respect to the nozzle.

* * * * *